United States Patent [19]

Sieren

[11] Patent Number: 4,462,611
[45] Date of Patent: Jul. 31, 1984

[54] FRONT END TRACTOR WEIGHT ASSEMBLY

[75] Inventor: Gerald E. Sieren, Greendale, Wis.
[73] Assignee: Allis-Chalmers Corp., Milwaukee, Wis.
[21] Appl. No.: 309,236
[22] Filed: Oct. 7, 1981
[51] Int. Cl.³ .............. B60R 11/00; B62D 37/04
[52] U.S. Cl. ................................................ 280/759
[58] Field of Search ............... 280/759, 760, 755; 212/195; 293/117; 180/900

[56] References Cited

U.S. PATENT DOCUMENTS

| | | | |
|---|---|---|---|
| 3,492,019 | 1/1970 | Folkerts | 280/759 |
| 3,822,073 | 7/1974 | Sieren | 280/760 |
| 4,094,534 | 6/1978 | Welke et al. | 280/759 |
| 4,232,883 | 11/1980 | Bougeous et al. | 280/759 |

FOREIGN PATENT DOCUMENTS

| | | |
|---|---|---|
| 1941316 | 3/1971 | Fed. Rep. of Germany . |
| 2423400 | 11/1975 | Fed. Rep. of Germany . |
| 2429901 | 8/1976 | Fed. Rep. of Germany ...... 280/759 |
| 2024739 | 1/1980 | United Kingdom ............... 280/759 |

*Primary Examiner*—Joseph F. Peters, Jr.
*Attorney, Agent, or Firm*—Arthur L. Nelson

[57] ABSTRACT

A front end weight carrier for supporting a plurality of front end weights underneath the grille of a tractor in a manner for conveniently changing the number of weights mounted on a support bar.

7 Claims, 5 Drawing Figures

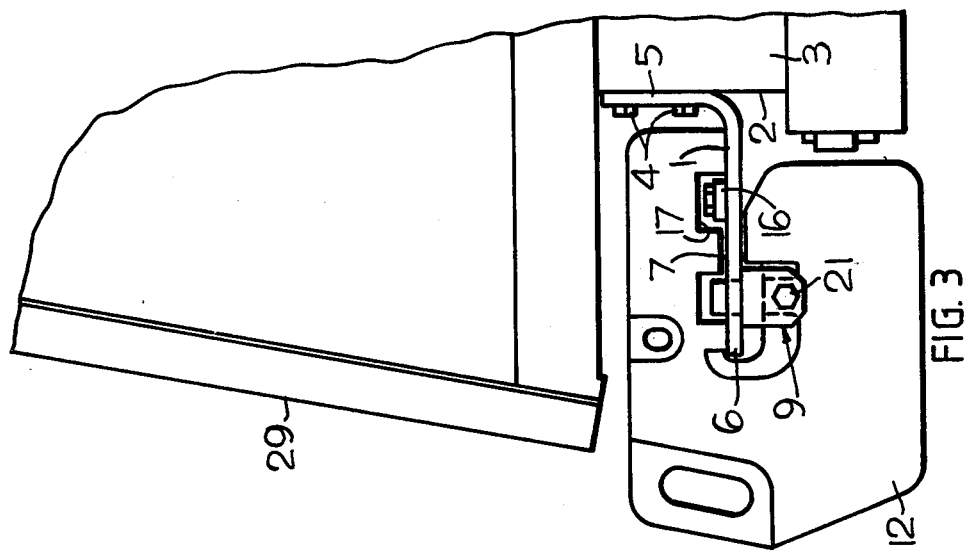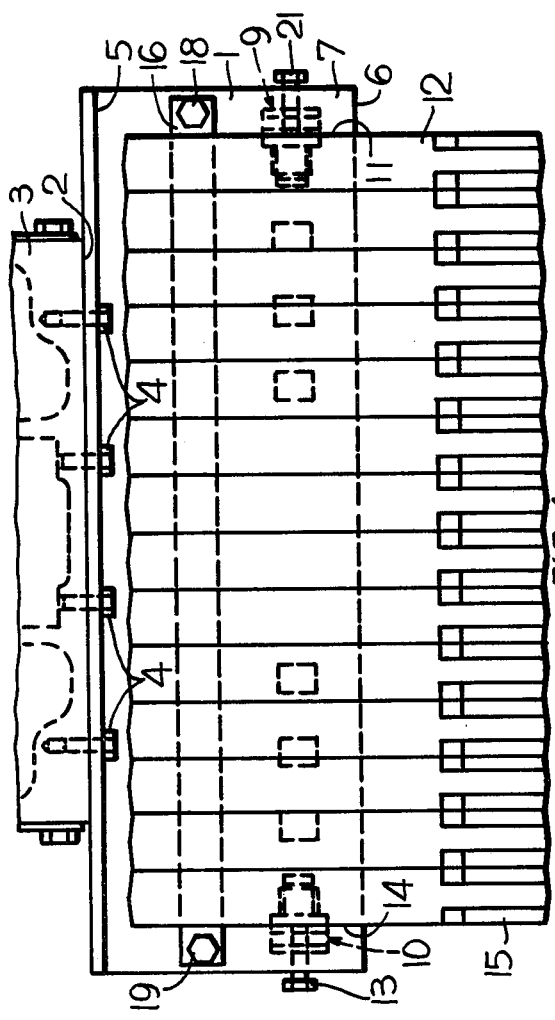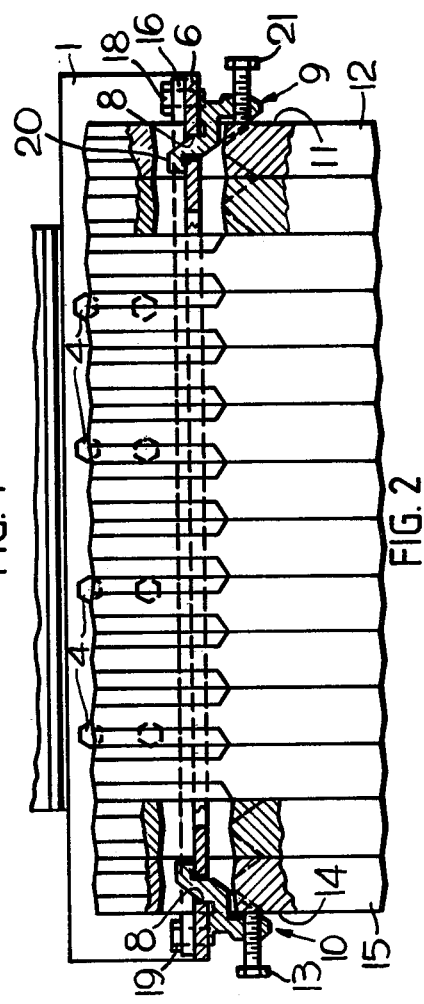

FRONT END TRACTOR WEIGHT ASSEMBLY

This invention relates to a front end weight carrier for supporting a plurality of front end weights and more particularly to a carrier including a bar immediately under the grille of the tractor for supporting a plurality of weights which can be easily mounted or removed from the carrier.

Front end weights are mounted on tractors to provide ballast on the front end. The weight assures traction on the front wheels and positive steering for the front wheels. This is particularly true in tractors using a hydraulic weight distribution system which senses draft loads and tends to redistribute the weight from the front wheels to the rear wheels and vice-versa, depending upon the draft load sensed by the hydraulic draft load sensing system. Accordingly, the additional weights are mounted on the front end and are usually mounted in a manner whereby they produce an extension of the overall length of the tractor. While this is acceptable in most cases, it can at times be troublesome during steering if the front end is excessively long. Accordingly, this invention provides for the mounting of the front end weights underneath the grille of the tractor. Since the grille is an extension beyond the radiator and usually forms a part of the normal length of the tractor, this invention provides a carrier mounted underneath the grille for supporting the front end weights under the grille and does not materially increase the overall length of the tractor. The carrier is in the form of a plate or bar so that the weights can be easily slid in on the bar from the side or the front for ease in assembly and disassembly of the weights on the tractor.

It is an object of this invention to provide a front end weight carrier on a tractor.

It is another object of this invention to provide a front end weight carrier including a carrier bar mounted underneath the grille of the tractor so that weights mounted on the bar do not materially extend beyond the front end of the tractor.

It is a further object of this invention to provide a front end weight carrier having a single cross bar extending across the front end of the vehicle mounted on the chassis underneath the grille to allow mounting of the front end weights essentially beneath the grille of the tractor.

The objects of this invention are accomplished by mounting the carrier bar on the front end of the chassis underneath the grille essentially for the width of the front end of the tractor. The carrier bar forms a flat platform surface in spaced relation to the underside of the grille whereby weights having a horizontal slot can be slid on to the bar from the side or the front of the tractor for ease in assembly or disassembling of the weights. The weights are fastened by means of fastening means fastening laterally to form a solid block of weights and means for preventing fore and aft movement of the weights on the carrier bar. This prevents the weights from rattling and retains them in a fixed position underneath the grille of the tractor.

Referring to the drawings, the preferred embodiment of this invention is illustrated.

FIG. 1 illustrates a plan view of the front end weights mounted on the carrier bar.

FIG. 2 is a front elevation view of the weights mounted on the carrier bar.

FIG. 3 is a side elevation view of the weights mounted on the carrier bar beneath the grille of the platform.

Figure 4:
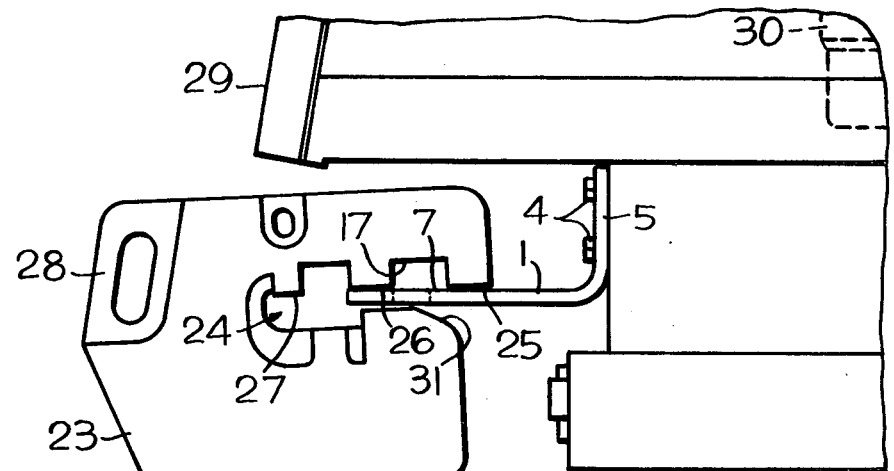
FIG. 4 is a side elevation view showing the position in assembling the weights on the carrier bar.
Figure 5:
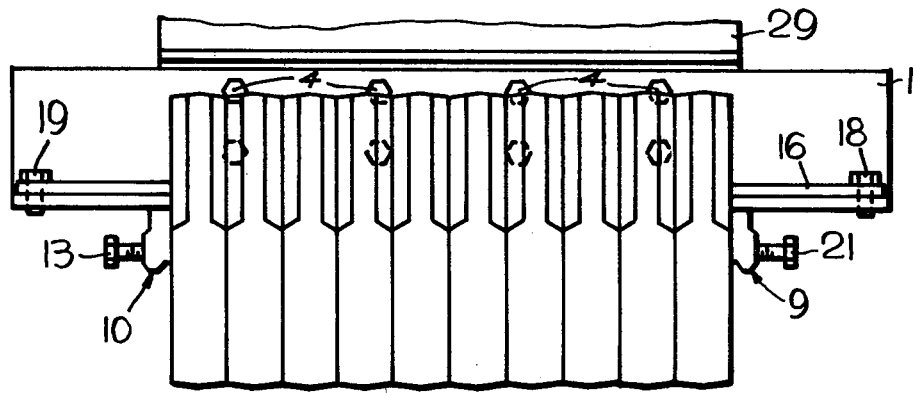
FIG. 5 is a front view of a reduced number of assembled weights on the carrier bar of the tractor.

Referring to FIGS. 1, 2 and 3, the carrier 1 includes a bar 5 which is mounted on a vertical facing 2 of the vehicle chassis 3 by means of a plurality of bolts 4. The carrier bar 5 is of an L-shaped cross section having a vertical flange 5 for mounting on the facing 2 and a horizontal support portion 6 forming a horizontal platform surface 7 for mounting of the front end weights. The carrier bar is formed with a plurality of holes 8 extending across the outer portion of the carrier bar for receiving bracket 9 and 10 on either side of the bar. The bracket 9 carries a bolt 21 for pressing against the side surface 11 of the weight 12 in the assembled position. Similarly, a bolt 13 is received in the bracket 10 and presses against the side surface 14 of the weight 15. A plurality of weights are positioned intermediate the two brackets. The number of weights is determined by the need for ballast on the front end of the tractor.

Once the weights are assembled on the carrier 5, the cross bar 16 is inserted in the recess 17 and fastened in an assembled position by the bolts 18 and 19.

FIG. 2 shows a lug 20 of bracket 9 extending through the opening 8. As the bolt 21 is tightened, it presses the bracket 9 firmly against the underside of the carrier bar 5 to lock the assembly of weights firmly in place. Similarly, the bracket 10 is positioned in an opening 8 and it firmly locks against the opposite side of the assembly of weights.

FIG. 4 shows the positioning of the weight 23 onto the carrier bar 5 by sliding the weight onto the platform surface 7 of the carrier bar 5. The bar 5 is received within the horizontal slot 24 of the weight 23. The weight rides inwardly on the carrier bar as it is supported by the surfaces 25, 26 and 27. The handle 28 provides a grip for handling of the weight in removal or assembly of the weight on the carrier bar 5. Fig. 3 shows the assembled position of the weight 12 on the tractor in which the weight 12 is mounted underneath the grille 29 of the tractor. The radiator 30 is mounted substantially behind the grille. It is noted that the space underneath the grille accommodates positioning of the weights without materially extending the overall length of the tractor.

The operation of the device will be described in the following paragraphs.

Since the weights for the front end of a tractor are quite heavy, means to facilitate assembly and disassembling of the weights on the carrier should be provided placing the carrier on the front of the tractor and underneath the grille, allowing the operator to easily lift the weight to the height of the assembling position as shown in FIG. 4. The weight 23 is formed with a beveled side 31 of the slot 24 of the carrier bar 5. This accommodates ease in alignment of the carrier bar 5 in the slot 24 as it is slid inwardly. Once the surface 25 is supported on the platform surface 7 of the carrier bar 5, the forward end or handle end can be lifted slightly to permit the weight to slide rearwardly to the operating position. The weight can be assembled from the side of the carrier bar 5 or the front of the carrier bar, depending on which is the most convenient for the operator. A plurality of weights are slid onto the carrier bar 5. The brackets 9 and 10 are each positioned in one of the openings 8 in the carrier bar and then bolts 21 and 13 are tightened. It might be mentioned that to assemble a number of weights the last to be assembled would be one of the intermediate weights in order to assemble the brackets. In this manner, the last weight will not interfer with assembly of the brackets when the brackets are inserted in the openings 8 of the carrier bar. The final tightening of the brackets seats the weights in their operating position. The tightening of the bolts normally holds the weights in position. However, to assure that they will not loosen or become disassembled, a cross bar 16 is inserted in the slot 17 of the weights in their assembled position. The bolts 18 and 19 are then fastened to assure that the weights cannot slide off of the carrier bar 5.

Disassembly of the weights is done in the reversed manner. The cross bar 16 is removed by loosening the bolts 18 and 19. The bolts 13 and 21 are then loosened allowing removal of the weights by sliding the intermediate weights forwardly and removing as many as desired. The brackets 9 and 10 are then reinserted in openings near the middle of the carrier bar and retightened to lock the weights in position. The cross bar 16 is then again fastened in position as shown in FIGS. 1, 2 and 3.

The embodiments of the invention in which an exclusive property or privilege is claimed are defined as follows:

1. A front end weight carrier assembly for a tractor comprising, a carrier bar supporting structure extending the width of the tractor, a carrier bar mounted on said supporting structure extending at least the width of the tractor and defining a horizontal weight supporting surface for slidably assembling weights from the front or sides of said tractor, a grille in spaced relation above said carrier bar, at least one weight having a horizontal slot extending into the weight for receiving said carrier bar and positioning said weight under said grille, said slot partially defined by a weight carrying surface forming a weight supporting interface with said weight supporting surface of said carrier bar, said weight including a handle on the forward end for convenience in assembly and disassembly on said carrier bar, fastening means for fastening weights to said carrier bar in fore and aft parallel position under the grille of said tractor including means defining a recessed portion extending above said slot, a cross bar extending through the recessed portion of said slot, means fastening said cross bar to said carrier bar, bracket means on each side of the weights on said carrier bar compressively biasing said weights together.

2. A front end weight carrier assembly as set forth in claim 1 wherein said carrier bar defines a plurality of holes extending laterally across the carrier bar, said fastening means includes brackets extending into openings of said carrier bar for fastening said weight to said carrier bar.

3. A front end weight carrier assembly as set forth in claim 1 wherein said slot defined by said weight includes a flared open end to facilitate alignment of the carrier bar in said slot when assembling the weight on said carrier bar.

4. A front end weight carrier assembly as set forth in claim 1 including a chassis defining a vertical carrier mounting surface, said carrier bar defines an L-shaped cross section including a vertical flange for mounting on the vertical carrier mounting surface and horizontal flange extending forwardly for carrying at least one weight.

5. A front end weight carrier assembly as set forth in claim 1 wherein said supporting structure includes a vehicle chassis, a vertical transverse surface formed on said vehicle chassis, said carrier bar defines a vertical flange for fastening to said vertical surface on said vehicle chassis.

6. A front end weight carrier assembly as set forth in claim 1 including means supporting said grille over said carrier bar, each of a plurality of said weights defining a length essentially the same as the overhanging of said grille.

7. A front end weight carrier assembly as set forth in claim 1 wherein said handle at the front end of said weight extends slightly beyond said grille in the operating position to facilitate assembly and disassembly of the weight on the carrier bar.

* * * * *